Figure 1:
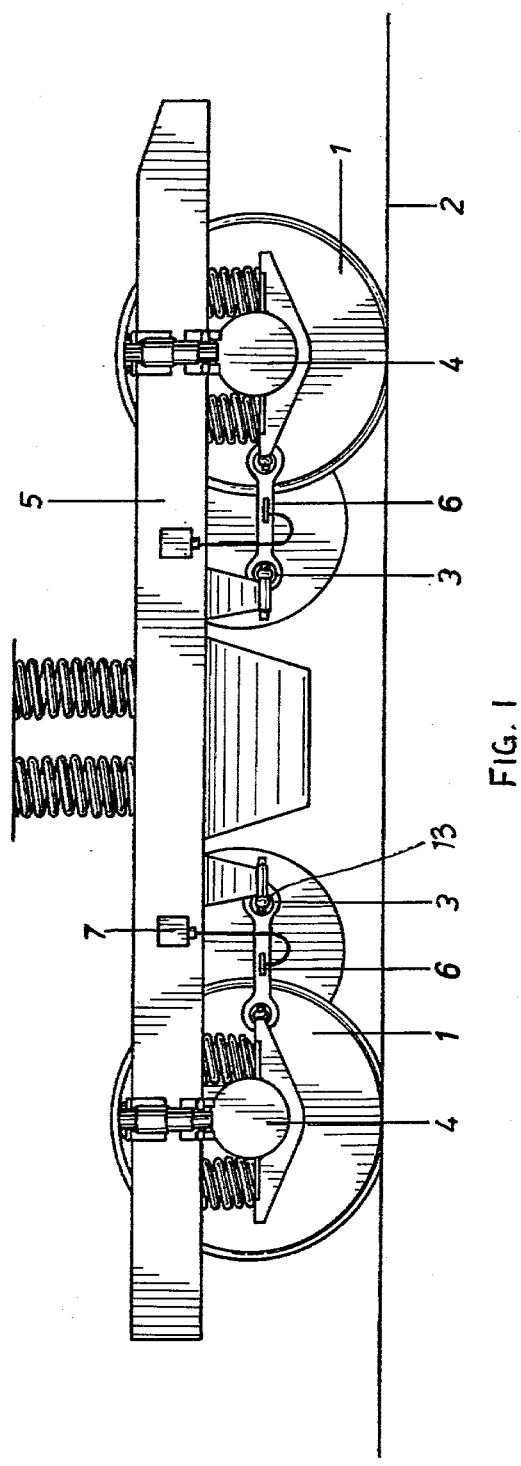

United States Patent [19]

Bitterberg

[11] 4,202,275
[45] May 13, 1980

[54] DEVICE FOR PROTECTING SELF-PROPELLED RAIL VEHICLES AGAINST SWAYING

[75] Inventor: Friedhelm Bitterberg, Fuldatal II, Fed. Rep. of Germany

[73] Assignee: Thyssen Industrie Aktiengesellshaft, Essen, Fed. Rep. of Germany

[21] Appl. No.: 830,462

[22] Filed: Sep. 6, 1977

[30] Foreign Application Priority Data

Sep. 3, 1976 [DE] Fed. Rep. of Germany ....... 2639737

[51] Int. Cl.² .............................................. G08B 21/00
[52] U.S. Cl. .................................................... 105/61
[58] Field of Search ...................... 73/650, 136; 105/61

[56] References Cited

U.S. PATENT DOCUMENTS

| 3,273,385 | 9/1966 | Donnelly et al. | 73/136 R |
| 3,937,152 | 2/1976 | Nilsson et al. | 105/61 |
| 3,952,587 | 4/1976 | Goodhart | 73/136 R |

Primary Examiner—Anthony V. Ciariante
Attorney, Agent, or Firm—Becker & Becker, Inc.

[57] ABSTRACT

A device for protecting a self-propelled rail vehicle against swaying, which device includes a measuring member for ascertaining the torsional vibrations of the wheels of a driving wheel set with regard to each other. This measuring member is arranged between the respective wheel set bearing and the carriage frame, preferably in the longitudinal direction of the vehicle. The measuring member is operable to ascertain the torsional vibration reactions between the respective wheel set bearing and the carriage frame and to bring about a corresponding control of the vehicle drive motor for a corresponding change in the pulling force of the wheel set.

3 Claims, 2 Drawing Figures

DEVICE FOR PROTECTING SELF-PROPELLED RAIL VEHICLES AGAINST SWAYING

The present invention relates to a device for protecting rail vehicles against swaying which device is provided with an element for absorbing rotary oscillations occurring on the vehicle wheels prior to a swaying or sliding action.

German Auslegeschrift No. 11 45 209 discloses devices for protecting against swaying, which devices are provided with a control member which at the start of a swaying step responds and reduces the control pressure conveyed to the output control member. According to this embodiment, a pressure monitor is provided as control member which when the device responds causes the control pressure to drop to a pressure level which terminates the swaying operation and assures a low driving power.

It is further known that a control operation may occur at different driving powers, depending on the driving speed and the friction parameter between wheel and rail.

By employing modern control devices with power thyristors, it is possible to realize a considerably better utilization of the friction value between the driving wheel sets and the rail than is the case with customary driving systems. With regard to the slipping behavior of the driving wheel sets, new problems are encountered. These problems will be outlined in connection with the slipping bahavior of an electric locomotive with three-phase asynchronous driving motors and preceding inverters.

The three-phase asynchronous driving motors have a relatively steep pulling force-speed characteristic so that small changes in the speed of the driving wheel set result in great changes of the pulling force, which means, at the start of the swaying operation the pulling force of the wheel set drops to such an extent that the wheel set must immediately quiet down again if the electric control does not correspondingly increase the frequency of the feeding three-phase current.

If the pulling force of the locomotive is continuously increased, the wheel set having the lowest wheel load will be the first to exceed the useful maximum of the friction value and will then acquire the tendency to sway. This known phenonenon can be counteracted by connecting either the three-phase asynchronous driving motors groupwise to a current machine which is fed in common by the inverters, or by making the control of the inverters for individually fed driving motors dependent on each other. With modern self-propelled rail vehicles, the wheel sets are frequently coupled to each other in this manner. This electric coupling of the wheel sets can, however, not prevent all driving wheel sets from together starting to sway at high pulling forces. As it is known, the swaying process starts only when a slip occurs between the driving wheel set and the rail which slip is greater than that slip that is required for creating the pulling maximum pulling force possible under the given circumstances. If it is possible to drive a wheel set within the range of its maximum pulling force, oscillations occur which with some structural elements of the vehicle result in overstresses. By different diameters of the driving wheels of a wheel set or when driving through curves, the wheels want to run at different speeds. Inasmuch as the wheels are being prevented from doing so by the wheel set shaft, a slip compensation occurs between the wheels and the rails. This compensation does not occur in a continuous manner. The wheel set shaft rather acts in the manner of a torsion spring and causes one or the other wheel of the wheel set briefly to slip. This friction between wheel and rail prevents a resonant rise or build-up of these actions. If the driving motor furnishes such a high driving moment that the slip conditions between the wheels and the rails approach the useful maximum, a residual friction is left which is no longer sufficient for dampening the torsional vibrations during the equalization between the wheels of a wheel set.

There is created a torsional vibration of the two wheels of a wheel set with regard to each other while the wheel set first acts like a spring. These torsional vibrations quickly reach a magnitude which will cause the wheel set shaft to break.

For safeguarding the wheel set shaft, such torsional vibrations have to be kept low at any rate and possibly are to be avoided altogether. On the other hand, the occurrence of these vibrations, according to heretofore findings represents an indicator for driving with the maximum possible pulling force.

The driving with maximum pulling force is thus also possible with changing frictional conditions between the driving wheel sets and the rails if it is possible to keep these terminal vibrations at a magnitude which is not dangerous for the wheel set shaft and for the running surfaces of the wheels.

It is, therefore, an object of the present invention to provide a device of the above mentioned general type which will prevent a swaying and which will make it possible early to recognize the torsional vibrations by measuring on structural elements which do not pertain to the drive.

These and other objects and advantages of the invention will appear more clearly from the following specification in connection with the accompanying drawing, in which:

FIG. 1 diagrammatically illustrates an embodiment of the present invention in connection with a two-axle bogie.

Figure 2:
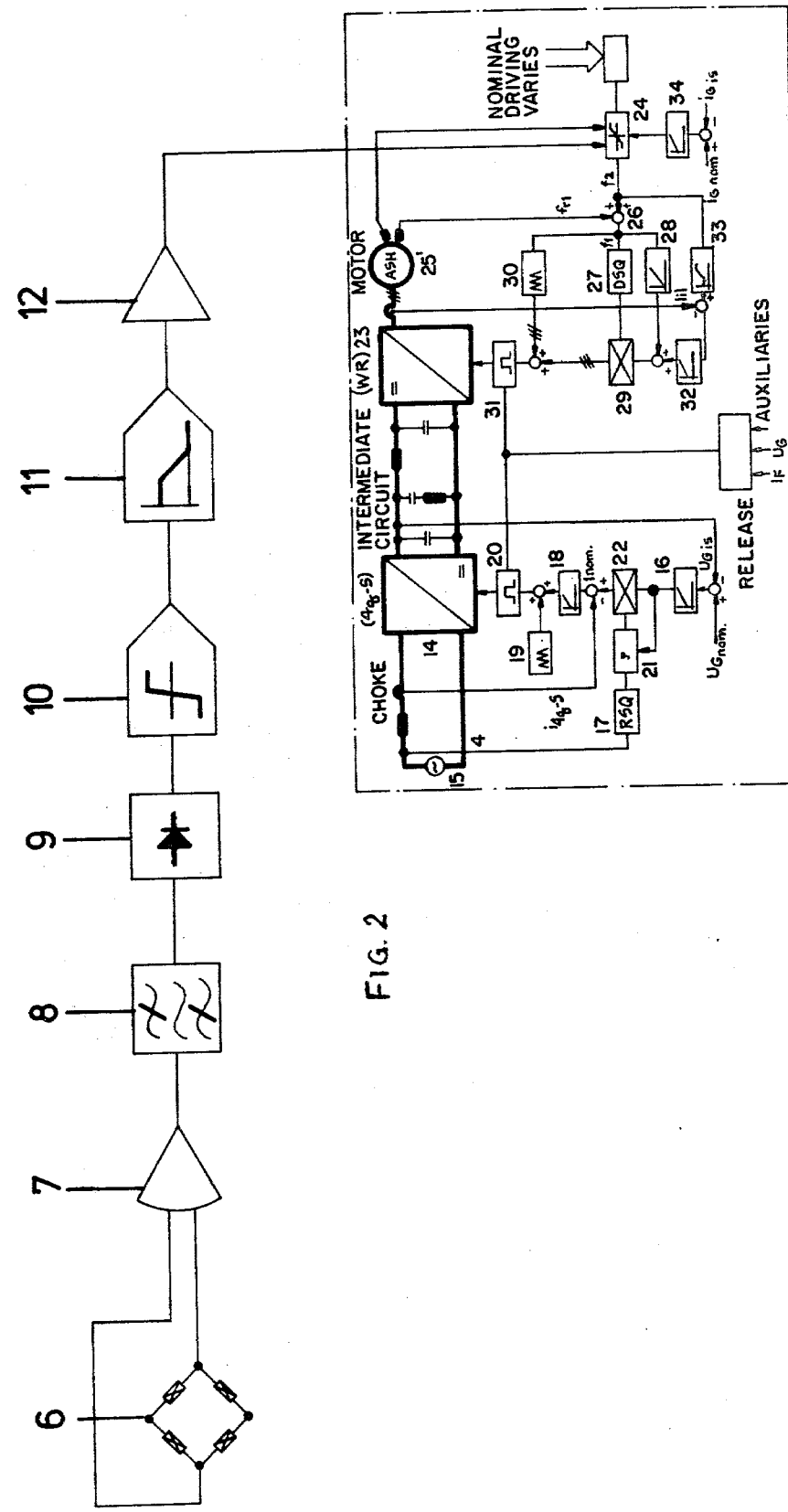

FIG. 2 diagrammatically shows the principle of operation of the electric circuit in connection with the present invention.

The sway protective device according to the invention is characterized primarily in that for ascertaining the torsional vibrations of the wheels of a driving wheel set with regard to each other, a measuring element is arranged between the wheel set bearing and the frame for the running mechanism, by means of which measuring element the torsional vibration reactions between wheel set bearing and frame for the running mechanism can be ascertained and a corresponding control of the driving motor and thereby of the pulling force of the wheel set can be initiated.

The advantages realized by the present invention consist primarily in that the start of the torsional vibrations of the wheels of a driving wheel set with regard to each other can be precisely measured also under unfavorable conditions.

Referring now to the drawings in detail, the two-axle undercarriage or truck shown in side view therein, comprises wheel set bearings 4 which in the longitudinal direction of the vehicle are respectively guided by means of guide rods 3 connected to the frame 5 for the running wheel system. When the two wheels of a driving wheel set through the intervention of the nonspecifically illustrated wheel set shafts undergoes axial torsional vibrations, reaction forces occur from the friction of the wheels 1 with the rails 2 in the guiding rods between the wheel set bearings 4 and the frame 5 for the running mechanisms.

The stresses or deformations caused by these forces in the guide rods 3 are ascertained by suitable measuring elements as for instance wire strain gauges 6, and the measuring signal is amplified in the amplifier 7. This measuring signal is conveyed to electric filter 8. Of the received variations in the deformations, the electric filter system allows only those deformation variations to pass the frequency region which correspond to the rotary oscillation of the wheel set. Through the intervention of a rectifier 9 and comparator 10, a signal is generated when rotary oscillations occur. This signal is conveyed through a function generator 11 and an inverter 12 to that portion of the control which from the rated driving values furnishes the rated slip frequency value for the asynchronous machine. This slip rated value and thereby also the pulling power of the wheel set are reduced to such an extent that the wheel set can no longer be driven within the region of strong rotary oscillations. The measuring device 6, in addition to the described and illustrated arrangement may also be arranged at the rubber elements 13 located at both ends in the guide 3.

Referring now to FIG. 2 showing a circuit which is principly known from the German Publication "Elektrische Bahnen, 47 (1976), Page 20, Issue 1, (4q−S) 14 is intended to maintain constant the intermediate circuit voltage independent of the load conditions, and to withdraw from the supply network 15 the current required therefrom in a sine-shaped manner and in phase with the course of the voltage. Changes in the voltage in the intermediate circuit, through the voltage regulator 16 change the rated amplitude value of the supply current. This value multiplied by a reference sine (RSQ) 17 derived from the supply network 15 voltage furnishes the rated value of the endless current ($i_{4q-S}$) 22. The exit of the subsequent current regulator 18 furnishes a picture of the required adjusting inlet voltage from which by means of a delta voltage 19 in the control set 20 the ignition orders are derived for the valves of the inlet adjuster of (4q−S) 14.

It is to be borne in mind that the current control is a momentary value control. The transmission behavior of the closed current control circuit, at a frequency f=16.66 Hz has a leading capacitive phase angle which is dependent on the parameter setting and the depth of modulation. A compression of the phase angle is obtained by a phase displacement of the reference sine signal in conformity with the modulation 21. By means of this control, it is possible over a wide modulation range to drive a power factor of about one or if necessary to withdraw from the supply network 15 capacitive as well as inductive reactive power. When the (4−S) 14 works, together with further release criteria there will be released the control set of the inverter (WR) 23, and the pertaining control devices. The driving orders become effective upon the control. From the rated direction value, the phase sequence of the three-phase current system is determined. From the rated driving value, through a limiting device 24, the rated slip frequency value is derived for the asynchronous machine or motor 25. This slip frequency rated value $f_2$ added to the temporary rotary frequency of the rotor 26 furnishes the rated value of the stator frequency.

In the three-phase current rated value source (DSQ) 27, there will be generated a picture of the three-phase voltage system with the predetermined stator frequency $f_1$. The amplitude of the voltage up to the rated frequency of the machine 25 is advanced proportional to the stator frequency as rated value 20 so that the motor 25 is energized with nominal flow ratio.

The multiplication of the course of the voltage from the (DSQ) 27 with the voltage rated value 29 furnishes a three-phase picture of the voltage between lines of a polyphase system of the motor 25. From this picture, by means of a delta or mesh voltage 20 the frequency of which amounts to a multiple of the stator frequency, in the control set 31, the ignition orders for the (WR) 23 are derived. This consideration applies to the speed range up to the rated point of the machine. The given off torque is about proportional to the advanced slip frequency. Above the rated point, the motor voltage is advanced only by voltage blocks with constant amplitudes. In the lower speed range, for correcting the voltage characteristic line, and for improving the course of the current in the motor 25, the exit of a current control circuit 22 is superimposed upon the amplitude advanced. The corresponding rated current value through a function generator 13 is derived from the said slip frequency $f_2$. The rated value is limited by the motor temperature delta, centrifugal action (the slipping wheels), the exit of a power limiting control 34, supply voltage reductions, and partial operational failures, for instance lack of venting.

Up to now the control art for the two current converters has been considered separately. It is expedient not to employ the constant intermediate voltage alone as information carrier between WR control and 4q−S control but through the limiting or interfering parameter circuits to couple the two controls to each other. This concerns the mutual releasing conditions for the controls and the regulators, the transmission of fast rated driving changes to the intermediate voltage control, the immediate power reduction on the motor in response to failure of the power supply, and the power limiting control with regard to the rated value.

It is, of coures, to be understood that the present invention is by no means limited to the specific showing in the drawing, but also comprises any modifications within the scope of the appended claims.

What I claim is:

1. A device for protecting self-propelled rail vehicles against swaying, which comprises in combination a measuring unit for ascertaining the torsional vibrations of the wheels of a driving wheel set with regard to each other, characterized in that between the wheel set bearings and the carriage frame in the longitudinal direction of the vehicle there is connected a reaction guide rod support and a measuring unit thereon immediately responsive to the torsional vibration reactions detected early in time below limit of slippage between the wheel set bearings and the carriage frame, and means to produce a corresponding control signal in response to said torsional vibration to the drive motor and thus control of the pulling force of the wheel set is adapted to be initiated for operation and travel in a safe range as to swaying and torsional vibrations.

2. A device according to claim 1, in combination with a wheel set guided by guiding means as to its horizontal movements, characterized in that each guiding means itself serves as measuring unit for deformations created by longitudinal forces acting upon said measuring unit and thus is utilized for ascertaining the torsional vibrations, and the deformations in the guiding means can be evaluated for the control of the drive motor.

3. A device according to claim 2, in combination further characterized in that the measuring unit includes an electric filtering system by means of which from the electric values generated by the deformations only those values obtained from the torsional vibrations can be conveyed.

* * * * *